United States Patent [19]

Fujita et al.

[11] 4,218,989

[45] Aug. 26, 1980

[54] APPARATUS FOR APPLYING REFRACTORY MATERIAL ONTO THE INNER SURFACE OF A FURNACE UNDER MONITORING BY A TV CAMERA

[75] Inventors: Masayuki Fujita; Sueki Kubo; Yasuo Nakamura, all of Kitakyushu, Japan

[73] Assignee: Kurosaki Refractories Co., Ltd., Kitakyushu, Japan

[21] Appl. No.: 964,311

[22] Filed: Nov. 28, 1978

[30] Foreign Application Priority Data

Dec. 8, 1977 [JP] Japan ................................ 52/148001

[51] Int. Cl.$^{2}$ .......................... B05C 7/02; H04N 7/02

[52] U.S. Cl. ........................................ 118/713; 427/8

[58] Field of Search ............................ 118/713; 427/8

[56] References Cited

U.S. PATENT DOCUMENTS 4,085,894 4/1978 Kubo et al. ...................... 118/317 X

*Primary Examiner*—James R. Hoffman

*Attorney, Agent, or Firm*—Jordan and Hamburg

[57] ABSTRACT

A lining apparatus of this invention is characterized by having a TV camera at a desired portion of a spray pipe and a monitoring device which is located outside of a furnace. The TV camera has a visual range directed toward the same direction as that of the spray nozzle. Due to the above construction, a clear image of an eroded portion of the furnace lining can be continuously observed by the monitoring device throughout the spraying operation. Accordingly, an operator can conduct a considerably accurate and safe lining operation.

7 Claims, 8 Drawing Figures

APPARATUS FOR APPLYING REFRACTORY MATERIAL ONTO THE INNER SURFACE OF A FURNACE UNDER MONITORING BY A TV CAMERA

BACKGROUND OF INVENTION

This invention relates to a lining apparatus provided with a TV camera, and more particularly to a TV camera construction which can be directly attached to a refractory material supply pipe such as a spray pipe and can provide the observation of the wear condition, the finished condition of the inner wall of the furnace as well as lining operation within the furnace from outside.

Since the conventional lining apparatus is not provided with a TV camera, an operator has to look into the inside of the furnace throughout the lining operation. In general, such lining operation is incorrect, inefficient and harmful to the operator. Such drawbacks are especially remarkable in the lining operation which is conducted under the atmosphere of high temperature or in the culvert.

It is an object of the present invention to provide a lining apparatus which can resolve the above defects of conventional lining apparatus and can provide the safe and accurate lining operation.

It is another object of the present invention to provide a lining apparatus provided with a TV camera, which has a cooling system and a dust removal system.

Such TV camera withstands the atmosphere of high temperature and protects the visual range thereof from the dust which occurs during the lining operation.

DETAILED DESCRIPTION OF THE DISCLOSURE

The lining apparatus of this invention is substantially characterized by mounting a TV camera on a spray pipe at a position adjacent to a spray nozzle thereof.

The TV camera is enclosed by an insulated box which, in turn, is provided with a light passing member at the front portion thereof. The TV camera is electrically connected with a monitoring device located outside of the furnace.

Due to the above construction, the image of the eroded portion of the inner surface is catched by the TV camera through the light passing member during the lining operation. Then the TV camera converts the image to electric signals and transmits the signals to the monitoring device and the monitoring device converts the electric signals to the clear image and projects the image on an observation screen of the monitoring device.

The lining apparatus of this invention is described in detail in the following description in conjunction with the attached drawings.

Figure 1:
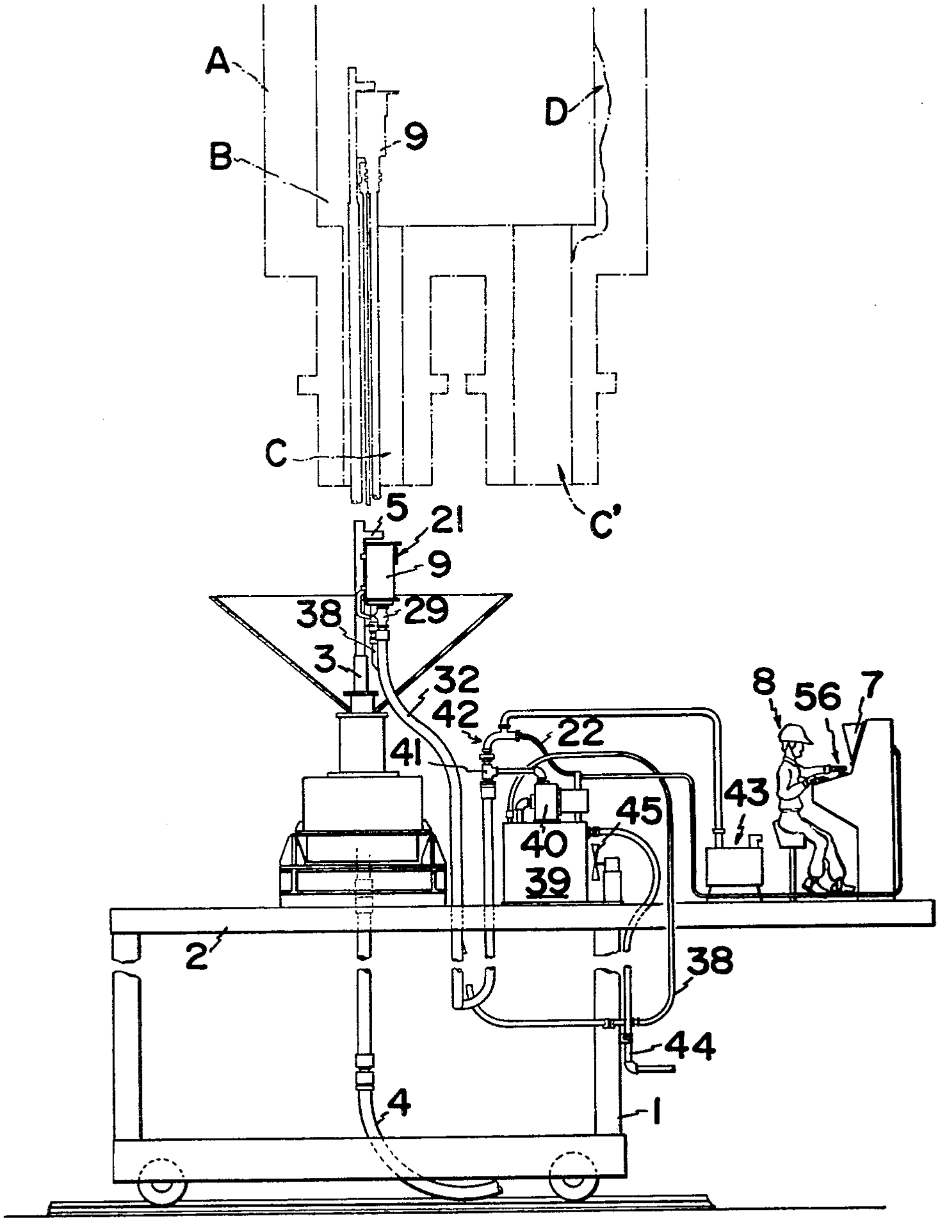
FIG. 1 is a front view of one embodiment of the lining apparatus of this invention.

In FIG. 1, a lining apparatus is shown just below an RH furnace (A). The RH furnace (A) is a vacuum vessel employed for a RH degassing method and is characterized by having a suction tube (C) and a discharge tube (C') which are both attached to the bottom of the furnace and communicated with the inside (B) of the furnace (A).

Although the lining apparatus can take any known construction, the lining apparatus of this embodiment has the construction disclosed in U.S. Pat. No. 4,085,894 registered on Apr. 25, 1978. Such lining apparatus substantially comprises a movable transport car (1), a spray pipe (3) vertically disposed on a frame structure (2) of the transport car (1), a drive means (not shown in the drawing) for effecting the elevation and rotation of the spray pipe (3) and a refractory-material supply device (not shown in the drawing) which sprays the refractory material from a spray nozzle (5) attached to the distal end of the spray pipe (3) by way of a flexible supply hose (4) and the spray pipe (3). If the lining is effected by a "shooting method," the spray pipe (3) is provided with an impeller at the outlet of the spray pipe (3). The lining apparatus which has the above construction conducts the lining operation such that the spray pipe (3) is placed just below the suction tube (C), the spray pipe (3) is extended into the interior (B) of the furnace (A) through the suction tube (C), the spray nozzle (5) is directed toward the eroded or abraded portion (D) of the interior (B) and finally the refractory material is sprayed from the spray nozzle (5) to the above eroded or abraded portion (D). In the above operation, it is apparent that the optimal lining operation can be achieved if the eroded or abraded portion (D) can be accurately and clearly observed throughout the lining operation. Accordingly, the lining apparatus of this embodiment is provided with a TV camera (6) at a position adjacent to the spray nozzle (5) of the spray pipe (3) and the TV camera (6) is electrically connected with a monitoring device (7) which is located outside of the furnace (A). Due to the above provision, an operator (8) can readily obtain the clear and accurate image of the eroded or abraded portion (D) of the interior (B) on the viewing screen of the monitoring device (7).

Figure 2:
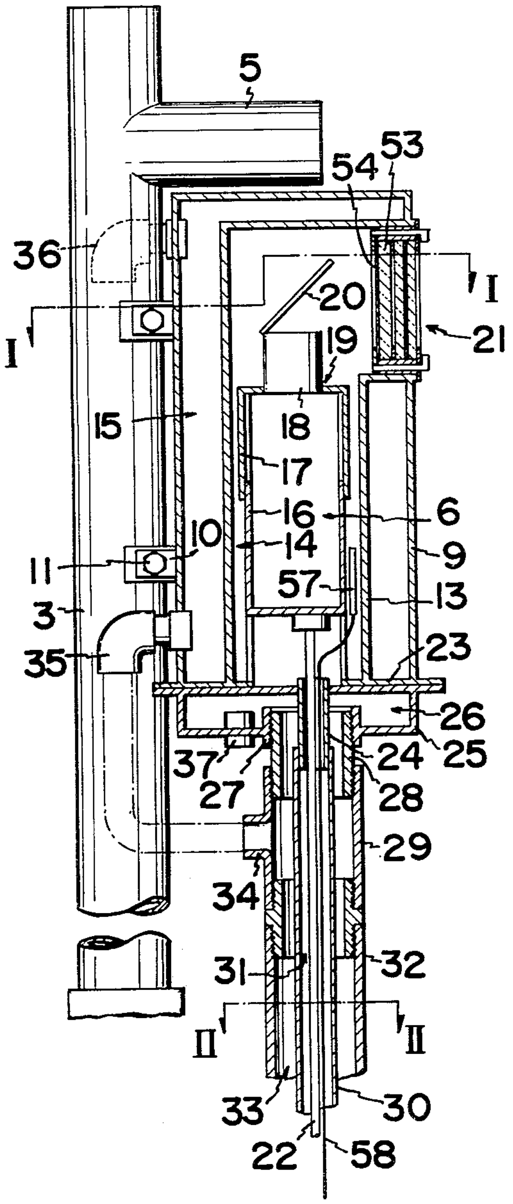
FIG. 2 is a cross sectional view of the TV camera mounting portion of the above lining apparatus.
Figure 3:
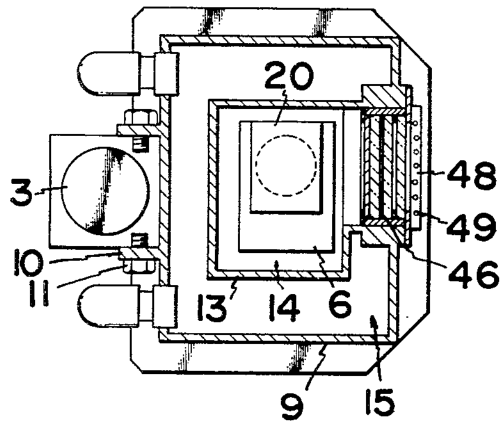
FIG. 3 is a transverse cross sectional view of the lining apparatus taken along the line I—I of FIG. 2.
Figure 4:
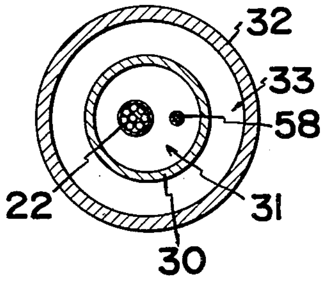
FIG. 4 is a transverse cross sectional view of the lining apparatus taken along the line II—II of FIG. 2.

The TV camera (6) is encased in a camera box (9) which is provided with a cooling or insulating system. FIG. 2 and FIG. 3 show the camera box (9) in cross section mounted on the spray pipe (3), wherein lugs (10) secured to the back of the camera box (9) are replaceably attached to the side of the shooting pipe (3) by means of bolts (11). This camera box (9) is divided into inner and outer chambers (14) and (15) by a partition plate (13), wherein the inner chamber (14) constitutes the air-cooling chamber and the outer chamber (15) constitutes the water-cooling chamber. A camera mounting structure is disposed within the inner chamber (14) which comprises a vertical cylindrical frame (16) and an upper lid (17). The TV camera (6) is supported by the above camera mounting structure and has the lens portion (18) thereof extended upward through an opening (19) of the upper lid (17). A mirror or a prism (20) which can reflect the light beam at 90 degrees is disposed above the lens portion (18) of the TV camera (6) such that TV camera can receive the light beams which enter the camera box (9) through the light passing member (21).

Referring now to the insulating or cooling construction of the camera box (6) in more details, a cable (22) which has one end connected to the TV camera (6) extends downward through a conduit (24) which has one end secured to a bottom plate (23) of the camera box (9). Another box (25) is mounted on the bottom plate (23) and defines a chamber (26) which encloses the conduit (24). A metal ring (27) for introducing water into the chamber (26) is secured to the bottom of the box (25) and encloses the conduit (24). A nipple (28) has one end thereof threaded into the metal ring (27) and has another end connected with a three-port joint (29). The conduit (24) has another end air-tightly secured to one end of a flexible hose (30) such as a vinyl hose. The cable (22) passes through the hose (30) in a relaxed manner so as to define an air passage (31) between the cable (22) and the hose (30). A water passage (33) is provided in the same manner between the flexible hose (30) and a flexible hose (32) which has one end connected with the three-port joint (29) while loosely enclosing the flexible hose (30). The air charged into the air passage (31) is introduced into the inner chamber (14) by way of the conduit (24) and effects the cooling of the entire TV camera (6) and the forming of an air curtain in front of the light passing member (21) which is described later in detail. The water charged into the passage (33) is introduced into the outer chamber (15) by way of a side opening (34) of the three-port joint (29) and an elbow joint (35) attached to the lower portion of the camera box (9). Thus introduced water cools the entire camera box (9) and simultaneously insulates the TV camera (6) from the high radiation heat of the interior (B) of the furnace (A). The water is also introduced into the chamber (26) by way of the three-port joint (29), the nipple (28) and the metal ring (27) for improving the cooling effect by water of the camera box (9). The water which is introduced into the outer chamber (15) and the chamber (26) is discharged from an elbow joint (36) and a discharged pipe (37) respectively attached to the upper portion of the camera box (9) and the bottom of the box (25) and returns to a desired reservoir tank by way of a flexible hose (38). It is needless to say that the above water cooling system can take any other preferred form besides the above mentioned construction. It is desirable that the air which is introduced into the inner chamber (14) for cooling the TV camera (6) is discharged from the TV box (9) at desired portions of the box (9) into the interior or outside of the furnace (A).

As shown in FIG. 1, a water storage tank (39) is mounted on the frame structure (2) of the transport car (1) and a pump (40) is mounted on the water storage tank (39). The water pumped out from the storage tank (39) by the pump (40) reaches a three port joint (41). Since the three-port joint (41) has one end connected with the other end of the flexible hose (32), the water is introduced to the water passage (33) by way of the three port joint (41). The three port joint (41) loosely encloses the flexible hose (30) like the flexible hose (32) and terminates the water passage (33) by sealing water-tightly the outer periphery of the flexible hose (30) with the other end of the joint (41). The extension of the flexible hose (30) which passes through the three port joint (41) has a branch portion (42) at the distal end thereof. The cable (22) encased in the flexible hose (30) is air-tightly reeled out from one leg of the branch (42) such that the outlet of the leg seals the outer periphery of the cable (22), while another leg of the branch (42) is connected with a pump (43) which, when operated, supplies compressed air to the passage (31). The reeled-out cable (22) has the distal end thereof connected with the monitoring device (7) which is also mounted on the frame structure (2). The return hose (38) which collects the water discharged from the chambers (15) and (26) has the distal end thereof connected with the water storage tank (39). The water storage tank (39) is fed with water by a water supply line (44) and may preferably be provided with a fan means (45) which effects the cooling of the water storage tank (39).

Thus, the TV camera (6) is provided with a double cooling effect by the water flow and the air flow so that the TV camera is sufficiently insulated from the high radiation heat of the furnace. The air mainly used for the above cooling effect is also utilized for providing an air curtain in front of the light passing member (21). This air curtain prevents dust which occurs during the lining operation from adhering to the front surface of the light passing member (21) and maintains a clear visual field for the TV camera (6).

Figure 5:
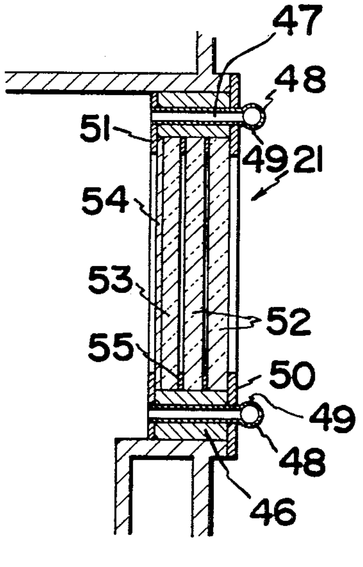
FIG. 5 is an enlarged cross sectional view of the light passing member.

The light passing member (21) has the construction shown in FIG. 5.

A window frame (46) is secured to the front of the box (9). The window frame (46) is integrally connected with the partition plate (13) and forms a part of the partition plate (13) which divides the camera box (9) into the inner and outer chambers (14) and (15). A plurality of air passages (47) are formed to the upper and lower brims of the window frame (46) respectively and these air passages communicate with the inner chamber (14). Furthermore, these air passages (47) are communicated with elongated tubes (48) attached to the upper and lower brims of the window frame (46). These elongated tubes (48) are respectively provided with apertures (49) directed toward the center of the light passing member (21) parallel to the front of the camera box (9). Due to the above construction, a part of the air introduced into the inner chamber (14) is sprayed from the apretures (49) and forms an air curtain in front of the light passing member (21). Although the air curtain which constitutes a cleaning device is formed by a pair of upper and lower perforated tubes (48) provided at the upper and lower brims of the window frame (46), such curtain can be formed by other provisions, for example by providing the perforated tube (48) at the side brims of the window frame (46) or by providing a single perforated tube on a desired brim of the window frame (46). It is also considered that instead of the air curtain a physical or mechanical cleaning device be provided in front of the light passing member (21) for removing the dust adhered to such light passing member (21).

The light passing member (21) is secured to the window frame (46) at the inside of the window frame (46) and the rear portion of the tubes (48). The light passing member (21) is also clamped by flanges (50) (51) provided at the front and rear ends of the window frame (46). The light passing member (21) can have any preferred constuction. Although in this embodiment, the light passing member (21) is constructed by combining a plurality of spaced-apart heat-resistant glass panes (52), a filter (53) and a heat reflecting plate (54), the light passing member (21) can be made only of a single or a plurality of heat-resistant glass panes (52).

Due to the above construction, in the lining operation, the operator can carry the spray pipe (3) and the TV camera (6) into the interior (B) through the suction tube (C) of the furnace (A) by manipulating a control panel (56) mounted on the frame structure (2) of the transport car (1) and can observe the eroded or abraded portion (D) of the furnace wall with the monitoring device (7) to which an image of the eroded portion (D) is transferred through the TV camera (6).

The light passing member (21) which is attached to the front of the camera box (9) is disposed adjacent to the spray nozzle (5) and also is directed in the same direction as that of the spray nozzle so that the light passing member (21) can cover the eroded or abraded portion (D) within the visual range thereof. In subsequent spraying operations for repairing the eroded portion (D), such light passing member (21) provides a clear image of the eroded portion (D) under spraying operation on the monitoring device (7). Furthermore, the light passing member (21) provides the observation of the finished condition of the eroded portion (D) after the spraying operation.

Since the light passing member (21) is provided with an air curtain in front thereof, the dust which occurs during the lining operation are prevented from adhering to the light passing member (21). Furthermore, if the TV camera is of an infrared type, the camera can transmit a clear image of the eroded portion (D) even in an extremely dusty atmosphere or culvert.

In spraying the inner surface of the suction pipe (C) which may have a narrow passage, the camera box (9) which encases the TV camera (6) may be removed and then the spraying operation can be effected in the conventional manner.

In spraying an eroded portion which resides on a furnace wall opposite from the furnace wall sprayed in FIG. 1, the spray pipe (3) and the TV camera (6) are carried to the interior (B) through the discharge pipe (C').

The camera box (9) which encases the TV camera (6) can be mounted above the spray nozzle (5). With this mounting position, the camera box (9) may be protected from the refractory material which drops from the opening of the spray nozzle (5).

The TV camera (6) is disposed parallel to the spray pipe (3) in view of the space that the TV camera occupies relative to the furnace space. If, however, the furnace space is sufficient, it is preferable that the TV camera (6) is disposed parallel to the spray nozzle (5). Such construction can unnecessitate the mirror or prism (20).

For regulating the temperature of the TV camera (6), a thermocouple (57) is attached to the camera mounting frame (16) and a lead line (58) of the thermocouple (57) is reeled out through the flexible hose (30).

Figure 6:
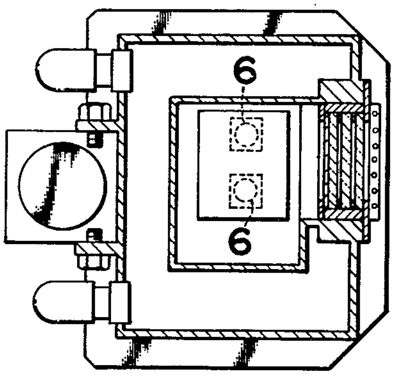
FIG. 6 is a explanatory transverse cross sectional view showing two sets of TV cameras in the cooling box.

As shown in FIG. 6, the TV camera (6) may have compound eyes so that the eroded or abraded portion (D) can be more clearly and accurately observed as seen by human eyes.

Figure 7:
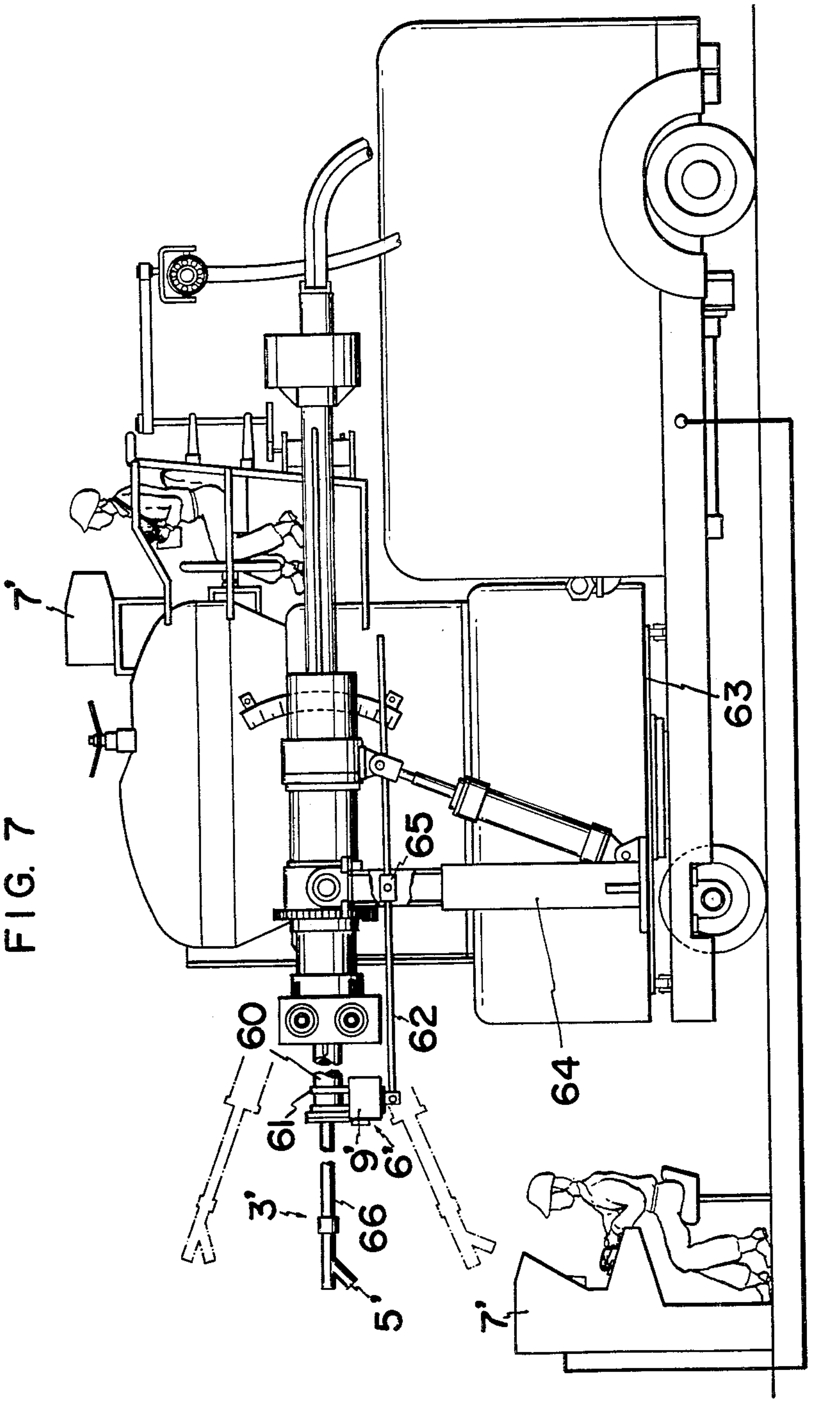
FIG. 7 is a side view of another embodiment of the lining apparatus of this invention.

FIG. 7 shows another lining apparatus which is employed for repairing the lining of a converter furnace. The lining apparatus is also provided with a TV camera (6') in place.

In this construction, since the spray pipe (3') extends or retracts in an axial direction, rotates on the axis thereof, tilts on a support (64), and turns on a horizontal plane along with a turntable (63), the TV camera (6) is preferably attached to a place which receives little influence by the above movements of the spray pipe (3'). For that purpose, the camera box (9') which encases the TV camera (6') is suspended from the front extremity of a main pipe (60) by way of a ring (61). The main pipe (60) constitutes a part of the spray pipe (3'). Furthermore, the rear portion of the camera box (9') is supported by an elongated bar (62) for preventing the fluctuation of the camera box (9'). The elongated bar (62) is slidably disposed within a tube (65) which is pivotally mounted on the side of the support (64). Due to the above construction, the camera box (9') can smoothly follow the movement (reciprocation, tilting and turning) of the main pipe (60). Furthermore, since the ring (61) is loosely held by the main pipe (60), the camera box (9') can maintain the suspended position even when the main pipe (60) rotates on the axis thereof.

It is needless to say that the visual range of the TV camera (6') covers the area to which the opening of the spray nozzle (5') provided at the extremity of the small pipe (66) is directed.

A monitoring device (7') is mounted either on the lining device or on the floor of the operation site.

Figure 8:
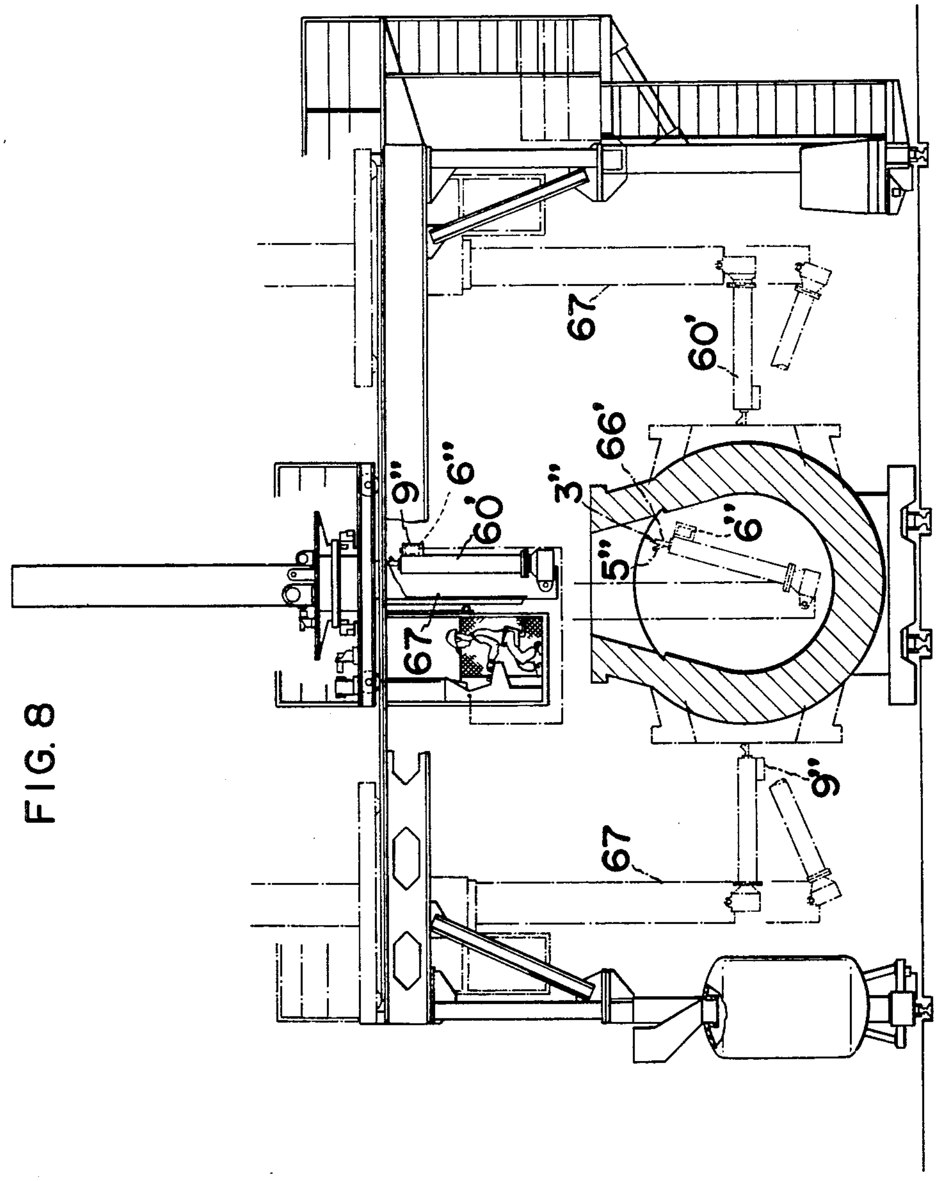
FIG. 8 is a side view of still another embodiment of the lining apparatus of this invention.

FIG. 8 shows still another lining apparatus which is used for the repairing of a mixer or a torpedo car. (The drawing shows a torpedo car.) Such lining apparatus is provided with a spray pipe (3'') which can be folded. In the drawing, a vertical column (67) is elevatably and rotatably mounted on a transport car which is movable on the floor. A main pipe (60') is pivotally attached to the lower extremity of the column (67). The main pipe (60') is rotated by a rotating mechanism (e.g. chains, hydraulic cylinders, but not shown in the drawing) and defines a desired angle relative to the column (67). Such main pipe (60') can also be accommodated in a recess formed in the column (67) which may have a U-shaped cross section. A camera box (9'') is secured to the extremity of the main pipe (60') such that a TV camera (6'') encased in the camera box (9'') can observe an eroded portion disposed in front of a spray nozzle (5'') of a small pipe (66'). The small pipe (66') is telescopically reciprocable at least in two stages and is rotatable within the main pipe (60'). The lining apparatus is further provided with a hose for cooling the TV camera (6''), a material supply hose, an air supply hose and hydraulic lines for actuating devices on the lining apparatus. These hoses or lines have a desired flexibility and are reeled out through the column (67).

Accordingly, the lining apparatus of this invention has the following advantages.

(1) Since an operator can conduct the lining operation while observing the interior of the furnace from outside, such lining operation becomes extremely accurate and conserves refractory material to be applied on the furnace wall.

(2) Since the TV camera is completely encased in an insulated and cooled camera box and receives the image of the eroded portion only through the heat-resistant light passing element, the TV camera can withstand the high radiation temperature of the interior of the furnace.

(3) Furthermore, a cleaning mechanism is provided in front of the light passing member for preventing the dust from adhering thereto, the TV camera can receive the clear image of the furnace interior.

It is needless to say that the lining apparatus of this invention is applicable not only to a spraying operation (including dry and wet spraying operations) but also deposition operations or shooting operations.

What we claim is:

1. In an apparatus for applying refractory material onto the inner surface of a furnace under monitoring by a TV camera comprising at least one elongated spray pipe having a spray outlet at the front extremity thereof, the improvement being characterized in that said apparatus further has a TV camera system which comprises:

(a) a TV camera mounted on said spray pipe adjacent to said spray outlet, said TV camera being encased in an insulated camera box, (b) a light passing member attached to the front of said camera box enabling said TV camera to receive an image of an eroded portion of said inner surface of said furnace, and (c) a monitoring device located outside of said furnace for receiving image signals from said TV camera and converting said image signals to said image of said eroded portion.

2. Apparatus for applying refractory material according to claim 1, wherein said insulated camera box encases a pair of parallel and spaced-apart TV cameras.

3. Apparatus for applying refractory material according to claim 1, wherein said insulated camera box comprises means defining an air chamber in which air flows around said TV camera.

4. Apparatus for applying refractory material according to claim 3, wherein said insulated camera box comprises means defining a water chamber around said air chamber means and in which cooled water flows.

5. Apparatus for applying refractory material according to claim 4, further comprising an air passage which communicates with said air chamber and a water passage which communicates with said water chamber, said passages being concentrically disposed over a cable which connects said TV camera with said monitoring device.

6. Apparatus for applying refractory material according to claim 1, further comprising a light passing member provided with a cleaning device in front thereof.

7. Apparatus for applying refractory material according to claim 6, wherein said cleaning device is a mechanism which provides an air curtain in front of said light passing member.

* * * * *